(12) United States Patent
Hoshi

(10) Patent No.: US 8,408,592 B2
(45) Date of Patent: Apr. 2, 2013

(54) VEHICLE SEAT

(75) Inventor: Masayuki Hoshi, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 89 days.

(21) Appl. No.: 13/031,869

(22) Filed: Feb. 22, 2011

(65) Prior Publication Data

US 2011/0204604 A1 Aug. 25, 2011

(30) Foreign Application Priority Data

Feb. 24, 2010 (JP) .................. 2010-039128

(51) Int. Cl.
B60R 21/16 (2006.01)
(52) U.S. Cl. .................................... 280/730.2
(58) Field of Classification Search ............. 280/730.2; 297/452.48, 452.47
See application file for complete search history.

(56) References Cited

U.S. PATENT DOCUMENTS

| 2,012,042 | A | * | 8/1935 | Gerlofson et al. | ............. 267/145 |
| 3,411,824 | A | * | 11/1968 | White et al. | ............. 297/452.56 |
| 3,506,308 | A | * | 4/1970 | Fenton | ..................... 297/452.47 |
| 4,043,544 | A | * | 8/1977 | Ismer | ............................. 267/83 |
| 5,630,615 | A | * | 5/1997 | Miesik | ......................... 280/730.2 |
| 6,546,578 | B1 | * | 4/2003 | Steinmeier | ......................... 5/653 |
| 7,677,669 | B2 | | 3/2010 | Blankart | |
| 7,934,774 | B2 | * | 5/2011 | Galbreath et al. | ........ 297/452.27 |

FOREIGN PATENT DOCUMENTS

JP 2008-514490 A 5/2008

* cited by examiner

Primary Examiner — Faye M. Fleming
(74) Attorney, Agent, or Firm — Drinker Biddle & Reath LLP

(57) ABSTRACT

A vehicle seat is provided having a sufficient rigidity and strength as well as a lighter weight. It comprises cushion materials and skin materials on a seat frame and has a plurality of triangle or circular recesses and projections that are continuously formed in at least a part of the seat frame.

14 Claims, 9 Drawing Sheets

VEHICLE SEAT

CROSS-REFERENCE TO RELATED APPLICATIONS

This application claims the foreign priority benefit of Japanese patent application no. JP2010-039128, filed Feb. 24, 2010. The contents of this application is herein incorporated by reference.

BACKGROUND

The present invention relates to a vehicle seat, particularly to a vehicle seat having a light weight and an good rigidity.

When a vehicle such as a motor vehicle impacted from the front side, the rear side, and the side, due to inertia force, a passenger is moved in the colliding direction of forward, rearward, and sideward, respectively, relative to the vehicle. Since a great shock is given to the passenger at this time, there is a need for ensuring safety of the passenger.

When the vehicle is impacted from the front side, the rear side, and the side, a technique of absorbing a load at the time of collision, that is, collision energy by a buffer structure (such as an engine room and a console box) provided on the vehicle body side to ensure the safety of the passenger is used. In order to transmit such collision energy to the vehicle body side to be absorbed, there is a need for enhancing rigidity of a vehicle seat on which the passenger is seated to efficiently transmit the collision energy to the vehicle body side.

When the vehicle is impacted from the rear side, and when baggage or the like is placed on the rear side of the passenger, the baggage is rapidly moved forward due to the inertia force. Thus, there is a need for protecting the passenger from a colliding object such as the baggage. Further, when the vehicle is impacted from the rear side, a body of the passenger is moved rearward. Thus, there is a need for reliably holding the body of the passenger by way of the vehicle seat. Therefore, in view of protecting the passenger from the colliding object, there is also a need for enhancing the rigidity of the vehicle seat.

In the vehicle seat, there is a need for providing the rigidity in order to hold a seating space of the passenger and to ensure the safety of the passenger without deformation not only due to the shock in the front and rear direction but also shock energy when the vehicle is impacted on a side surface.

Japanese Patent Application Publication No. 2008-514490 ("the '490 Publication") relates to a seat back structure for a vehicle seat and discloses a vehicle seat in which plate shaped front and rear shells formed into a seat back shape are arranged to face each other and adhered to each other.

With such a configuration, the rigidity against the shock in the front and rear direction and the left and right direction (the seat width direction) is enhanced in the seat back of the vehicle seat.

The technique disclosed in the '490 Publication discloses a configuration that the plate shaped front and rear shells respectively arranged in the front and rear direction are adhered to each other in a seat back frame.

However, the technique of the '490 Publication discloses the configuration that two plate shaped members having size of the seat back frame are adhered to each other. Thus, there is a disadvantage that weight of the entire seat is increased.

By reducing plate thickness of the front and rear shells, the seat back frame can have a lighter weight. However, rigidity of the front and rear shells is lowered, so that there is a problem that strength is lowered when a load in the front and rear direction and the left and right direction is imposed.

SUMMARY

An object of various embodiments of the present invention is to provide a vehicle seat having a reduced plate thickness of members thereof for suppressing a weight increase, and sufficient rigidity against a shock in the left and right direction and the front and rear direction.

According to an embodiment, the above problem is solved by a vehicle seat having a cushion material and a skin material on a seat frame, in which a plurality of triangle or circular recesses and projections are continuously formed in at least a part of the seat frame.

In such a way, by arranging the triangle or circular (including conical and frustum) recesses and projections in at least a part of the seat frame in the vehicle seat, strength and rigidity against a shock are improved in the part due to a structural mechanism. At this time, the "triangle or circular recesses and projections" are preferably a Pseudo-Cylindrical Concave Polyhedral (PCCP) structure or a dimple structure described in embodiments.

Strength of members thereof is enhanced by forming the PCCP structure or the dimple structure. Thus, even when a vehicle is impacted in the front and rear direction and the left and right direction and the shock is given, the vehicle seat is not crushed by the shock and deformation is reduced.

Conventionally, in order to provide a vehicle seat having strength for the time of collision, a reinforcing member is additionally provided or plate thickness of members thereof is increased. Thus, weight of the seat tends to be increased. Meanwhile, by forming the recesses and projections with the above configuration in the members, the vehicle seat has a high durability against the collision even with a small plate thickness.

In an embodiment, the seat frame is provided with a coupling member for coupling side frames arranged to be spaced from each other, and a plurality of the triangle or circular recesses and projections are continuously and regularly formed on a surface in at least a part of the coupling member.

The seat frame is provided with members arranged between a pair of the side frames corresponding to side portions, that is, an upper member positioned in an upper part of the vehicle seat, and a lower member positioned in a lower part, members arranged in substantially rectangular spaces partitioned by the upper, lower and side members, and further, a coupling member such as a pan frame bridged in a seating frame.

In such a way, when a plurality of the recesses and projections (the PCCP structure or the dimple structure) are continuously and regularly formed in the coupling member forming seat width, the vehicle seat has a particularly high strength against a load in the seat width direction.

In an embodiment, a side airbag unit is arranged on the side of the vehicle seat, and the triangle or circular recesses and projections are formed on a surface in at least a part of the seat frame at a position corresponding to the side airbag unit.

In such a way, in the configuration that the side airbag unit is provided on the side of the vehicle seat, when an airbag is inflated, a sideward load is imposed on the vehicle seat due to inflation of the airbag. By enhancing the strength of the seat frame in at least a part in a height range where the side airbag is attached, the deformation of the vehicle seat is suppressed even in a case of the inflation of the side airbag. Therefore, without the deformation of the vehicle seat, shock energy from the side is transmitted to the vehicle body side, so that the shock is absorbed.

In an embodiment, the triangle or circular recesses and projections may be formed in at least a part of the seat frame at a position corresponding to the console box installed on the side of the vehicle seat.

In such a way, when the recesses and projections are formed in at least a part of the vehicle seat in a height range where the console box is provided, the strength of the seat frame is enhanced in a range corresponding to the console box. With this configuration, when the load from the side is imposed, the vehicle seat is not deformed to buffer collision energy but the collision energy is buffered by way of the console box as a buffering material.

In an embodiment, the coupling member has a bulged surface curved upward and bulged, and a plurality of the triangle or circular recesses and projections are continuously formed at a bulged surface of the coupling member.

In such a way, by providing the bulge surface in the coupling member and making a surface thereof to be a smooth convex shape to form the PCCP structure or the dimple structure, the vehicle seat can have a particularly large deformation resistance and a high rigidity in the case where an excessive load is imposed due to the collision.

In an embodiment, the coupling member is formed by a tubular member, and a plurality of the triangle or circular recesses and projections are continuously formed in at least a part of the coupling member.

In such a way, by making the coupling member into a tubular shape, the strength against the load from the side is enhanced. Since the inside is hollow, the coupling member can have a lighter weight.

By forming the recesses and the projections in at least a part of the seat frame, the rigidity is enhanced. Thus, at the time of the collision in the front and rear direction and the left and right direction, the deformation resistance against the shock thereof is large, and as a result, the collision energy is transmitted to the vehicle body side. Since the member in which the recesses and the projections are provided has a sufficient strength even with a small plate thickness, the vehicle seat having a lighter weight is provided.

By forming the recesses and the projections in the member forming the seat width, the vehicle seat having a higher strength against the shock at the time of the collision is provided.

Even in the case where the side airbag unit is actuated and the airbag is inflated, the vehicle seat transmits a shock load thereof to the vehicle body side.

When the shock energy is imposed at the time of the collision on the side surface, the shock energy is transmitted to the console box functioning as the buffering material.

With the curved coupling member, the rigidity is enhanced, and the vehicle seat can not easily be deformed even when the vehicle is impacted in the front and rear direction and the left and right direction.

With the tubular coupling member, the strength against the load is enhanced.

As described above, the vehicle seat is provided with the member in which a plurality of the triangle or circular recesses and projections are arranged. Thus, with the structural mechanism thereof, the vehicle seat has a high strength against the shock due to the collision and the like. By providing such recesses and projections, the strength against applied force is enhanced. Thus, even when the plate thickness of the member is reduced, the vehicle seat has a high strength. Therefore, the vehicle seat having a high strength and a lighter weight is provided.

DESCRIPTION OF THE DRAWINGS

Various embodiments of the invention are illustrated in the drawings and described in more detail below.

DETAILED DESCRIPTION

Hereinafter, embodiments of the present invention will be described with reference to the drawings. It should be noted that members, arrangement, and the like described below do not limit the present invention but, as a matter of course, can variously be modified consistent with the gist of the present invention. In the present specification, the term "vehicle" indicates a traveling vehicle to which a seat can be equipped, including a ground running wheeled vehicle such as a motor vehicle and a train, and an airplane and a vessel moving in an area other than the ground. A "load at the time of collision" is a heavy load generated due to collision in all the directions including the front and rear direction and the left and right direction, indicating a large collision in all the directions due to a vehicle, but does not include a load area similar to a load generated at the time of normal seating and boarding of a passenger.

First Embodiment

FIGS. 1 to 6 are related to a first embodiment of the present invention.

Figure 1:
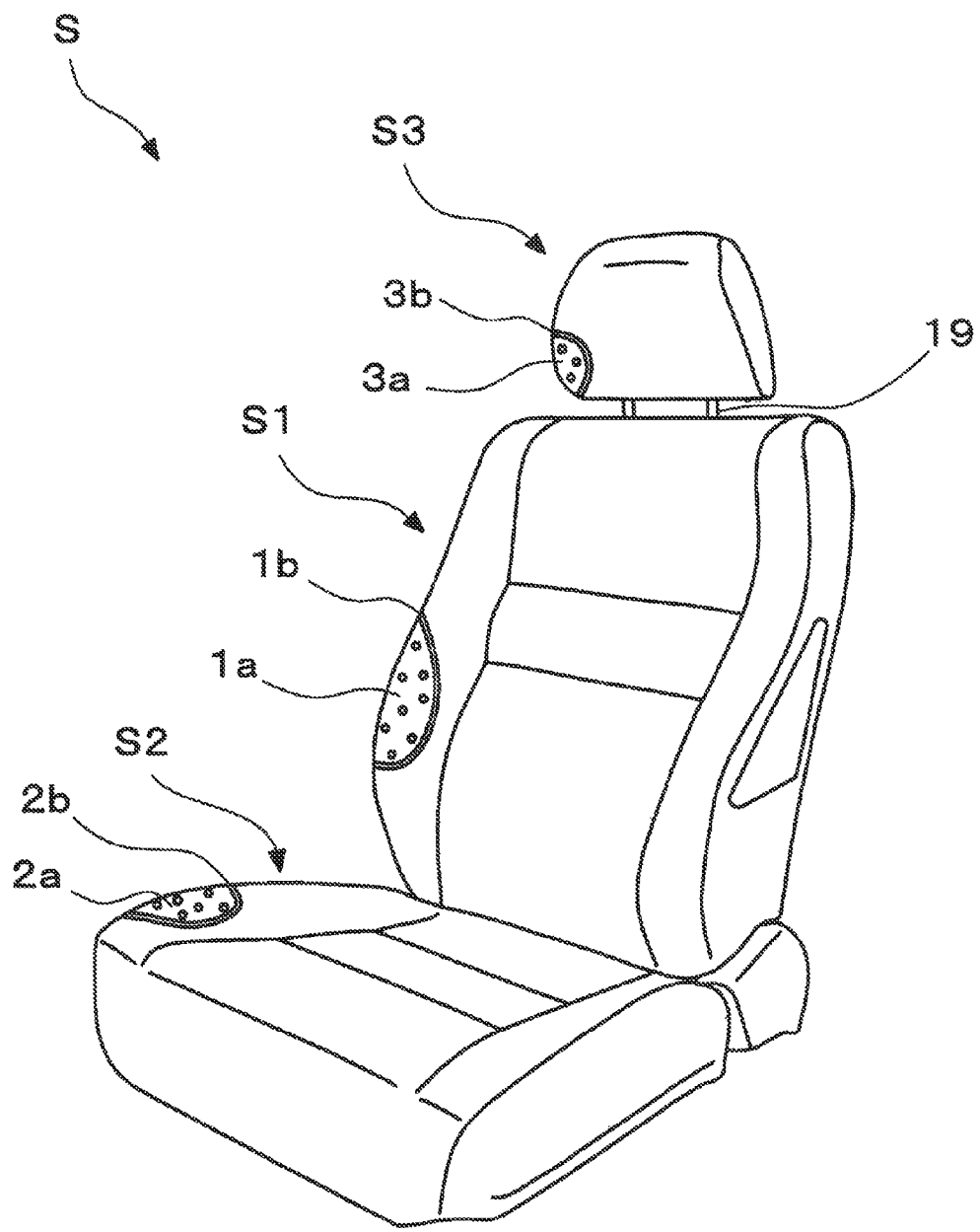
FIG. 1 is a schematic perspective view of a seat according to a first embodiment of the present invention.

A vehicle seat S according to the first embodiment is formed by a seat back S1 (a back portion), a seating portion S2, and a headrest S3 as shown in FIG. 1. The seat back S1 (the back portion) and the seating portion S2 are formed by mounting cushion pads 1a, 2a on a seat frame F and covering the cushion pads with skin materials 1b, 2b. The headrest S3 is formed by arranging a cushion material 3a onto a core (not shown) of a head portion and covering the cushion material with a skin material 3b. The reference character 19 denotes headrest pillars supporting the headrest S3.

Figure 2:
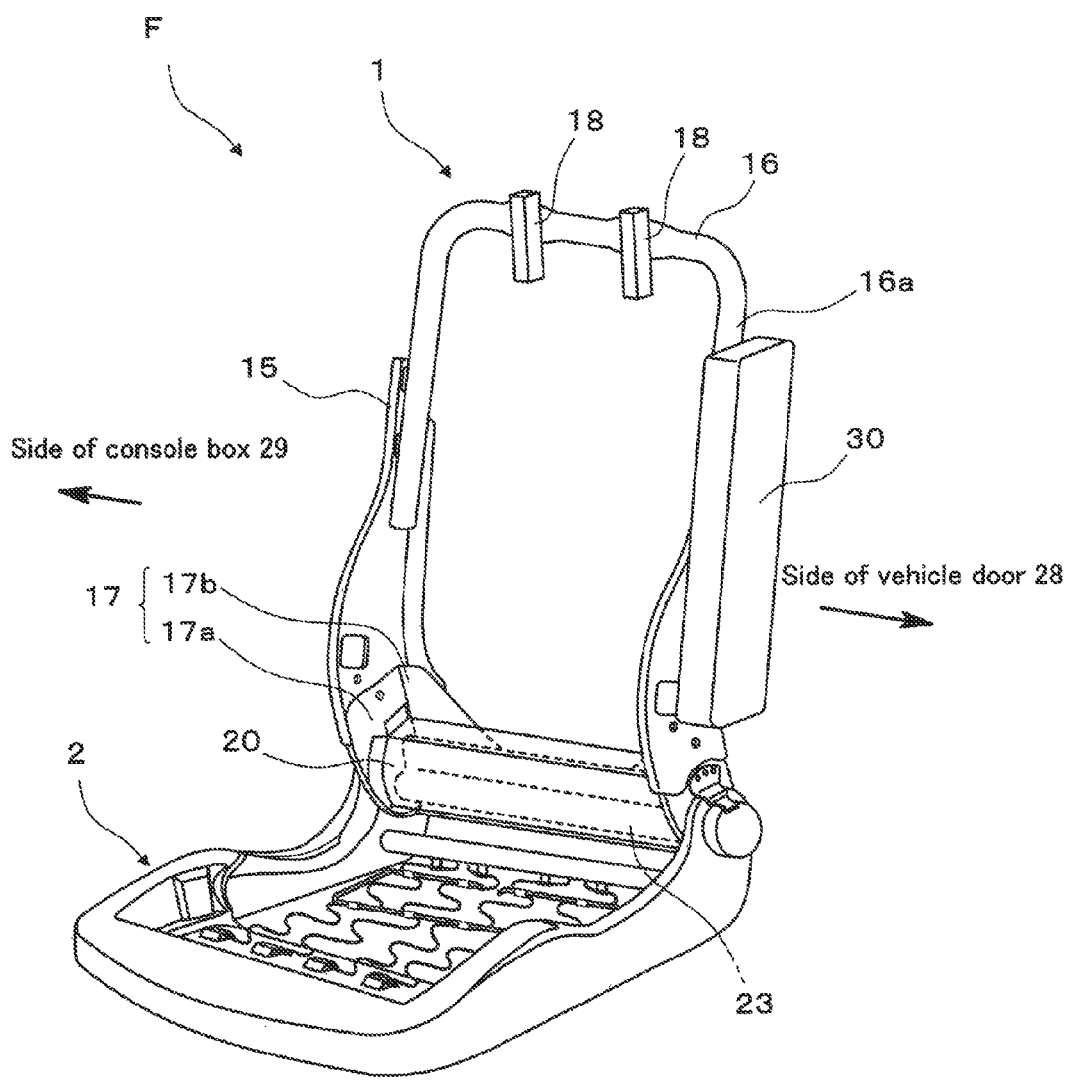
FIG. 2 is a schematic perspective view of a seat frame according to the first embodiment of the present invention.

As shown in FIG. 2, the seat frame F of the vehicle seat S is formed by a seat back frame 1 forming the seat back S1, and a seating frame 2 forming the seating portion S2.

The seating portion S2 is formed by mounting the cushion pad 2a on the seating frame 2 as described above and covering the cushion pad 2a with the skin material 2b, to support the passenger from the lower side. A pan frame is preferably bridged in the seating frame 2 in order to enhance rigidity of a seat cushion.

The seating frame 2 is supported by leg portions, and inner rails (not shown) are attached to the leg portions and assembled as a sliding type, in which a position of the seating frame is adjustable in the front and rear direction with respect to outer rails installed in a vehicle body floor. A rear end of the seating frame 2 is coupled to the seat back frame 1 via a reclining mechanism (not shown).

The seat back S1 is formed by mounting the cushion pad 1a on the seat back frame 1 as described above and covering the cushion pad 1a with the skin material 1b, to support the back of the passenger from the rear side. In the present embodiment, the seat back frame 1 is formed into a substantially rectangular frame body as shown in FIG. 2, and provided with side members, an upper member, and lower members.

As described below, the seat back frame 1 is provided with an upper frame 16 serving as the upper member on the upper side of side frames 15 serving as the side members, and a lower frame 17, a member frame 23, and reclining shafts (not shown) serving as the lower members. A coupling member 20 is bridged between the side frames 15 as a bridging member.

The side members are spaced from each other in the left and right direction to form a seat back width, and have the two side frames 15 extending in the up and down direction. The upper frame 16 for coupling upper ends of the side frames 15 extends upward from the side members, to form the upper member.

A lower part of the seat back frame 1 is formed by coupling lower ends of the side frames 15 by the lower frame 17 (the lower member). The lower frame 17 has extension portions 17a coupled to lower parts of the side frames 15 and extending downward, and an intermediate portion 17b for coupling both sides. The extension portions 17a extend in a range where the extension portions do not disturb the seating frame 2.

Although the seat back frame 1 of the first embodiment is formed by separate members of the side frames 15, the upper frame 16, and the lower frame 17, the seat back frame may be formed by an integrated pipe frame, an integrated plate shaped frame, or the like.

The reclining mechanism is provided with at least the reclining shaft (the lower members not shown). The reclining shaft (not shown) is arranged to be inserted from holes (not shown) provided in the extension portions 17a of the lower frame 17 through side portions of the seat frame F.

The member frame 23 (the lower member) is formed in the lower frame 17 toward the front side of the seat frame F. The member frame 23 is fixed and jointed to the intermediate portion 17b and the extension portions 17a of the lower frame 17, and designed to have a substantially tubular hollow shape. Since the reclining shaft (not shown) passes through the hollow inside of the member frame 23, the member frame 23 does not abut with the reclining shaft (not shown), so that rotation of the reclining shaft (not shown) is not disturbed. The coupling member 20 is attached in the vicinity of the member frame 23.

This member frame 23 is not an essential element. When the seat back frame 1 has a sufficient strength against a shock from the side, the member frame 23 is not necessarily provided. At this time, since the number of parts is minimized, the seat frame F can have a lighter weight.

In the case where the member frame 23 is not provided, ends of the coupling member 20 are jointed to the extension portions 17a of the lower frame 17, so that the all sides of the coupling member 20 in which a PCCP structure is formed as described below are closed. Thus, the strength is enhanced.

As shown in FIG. 2, the upper frame 16 is a substantially U shape member, and side surface portions 16a of the upper frame 16 are partially overlapped with side plates of the side frames 15. The upper frame is fixed and jointed to the side frames 15 at the overlapped parts.

On the upper side of the upper frame 16 forming the upper member, the headrest S3 is arranged. The headrest S3 is formed by providing the cushion material 3a in an outer peripheral part of the core (not shown) as described above and covering an outer periphery of the cushion material 3a with the skin material 3b. Pillar support portions 18 are arranged in the upper frame 16. The headrest pillars 19 supporting the headrest S3 (refer to FIG. 1) are attached to the pillar support portions 18 via guide locks (not shown), so that the headrest S3 is attached.

As described above, the side frames 15 serving as the side member forming a part of the seat back frame 1 are formed to have predetermined length in the up and down direction, face each other, and have a predetermined gap in the left and right direction. The coupling member 20 is arranged in an inner area of the seat back frame 1 (between both the side frames 15).

The coupling member 20 of the first embodiment is a member made by forming metal into a substantially square hollow column, and slightly bulged on the passenger side. That is, a smooth convex portion is formed on a surface on the side where the coupling member is in contact with the cushion pad 1a. The member frame 23 passes through the inside of the coupling member 20.

The ends of the coupling member 20 formed into a substantially square column are fixed and jointed to the extension portions 17a of the lower frame 17, and the coupling member is arranged on the front side of the intermediate portion 17b. Fixing and jointing can include welding, rivet jointing, bolt fastening, and spot welding. Among these, metal inert gas welding, laser welding, and the like are preferably used.

Therefore, joint portions bent at sides to abut with the extension portions 17a of the lower frame 17 and placed onto the extension portions 17a are preferably formed in the coupling member 20, since the coupling member is easily fixed and jointed.

The cushion material (the cushion pad 1a) is arranged between a position corresponding to a lumbar part of the passenger and the coupling member 20, and the coupling member 20 is arranged at a position on the lower side of the lumbar part of the passenger via the cushion pad 1a and the skin material 1b.

Although the coupling member 20 is a substantially square column member in the first embodiment, the coupling member may be formed by a pipe member described in a second embodiment and the following embodiments, or a plate shaped member. The coupling member 20 is only required to be a member bridged between the side frames 15, and, for example, indicates the upper frame 16, a front plate (not shown), a back plate, and the like.

The PCCP shell structure is formed on a surface of the coupling member 20 as recess-projection processing. The PCCP structure represents pseudo-cylindrical concave polyhedrons. A macroscopic shape thereof is close to a cylindrical shape. However, in fact, pairs of triangles are arrayed in a diamond shape, or trapezoids are arrayed in a hexagonal shape with upper bases or lower bases thereof matched to each other.

Such a PCCP structure is formed by combining recesses and projections of polygons (such as triangles and trapezoids) and spreading the recesses and the projections all over the surface of the coupling member 20 without any clearance. The coupling member 20 having the surface on which such a PCCP structure is provided is preferably formed by press molding. By forming the PCCP structure on a surface of a curved member such as the coupling member 20 of the first embodiment, a particularly high rigidity against the load at the time of the collision is obtained.

At this time, the size of the polygon, that is, the length of one side of the polygon is preferably about 10 to 100 times more than thickness of the coupling member 20. When this length of the one side of the polygon is appropriately changed depending on a member or a part for which the PCCP structure is adopted, the seat frame F having a higher strength is provided.

By forming the PCCP structure, the coupling member 20, in an embodiment, is designed to have a plate thickness smaller than usual. This is because a plate material (member) in which the PCCP structure is formed is stable in terms of structural dynamics, and has an enhanced strength in comparison to a normal flat and smooth plate material (member).

Therefore, in the case where similar strength is required, the member having the PCCP structure can have a smaller plate thickness in comparison to a member not having the PCCP structure. This plate thickness is appropriately designed depending on a material of the member having the PCCP structure.

Therefore, by adopting the PCCP structure as described above, the member having the PCCP structure can have a small plate thickness. Thus, the seat frame F having a lighter weight is provided.

This is because when the PCCP structure is adopted, shock energy at the time of the collision is absorbed by line parts of the polygons attached onto the surface.

As described above, the side ends of the coupling member 20 formed into a substantially square hollow column are fixed and jointed to the extension portions 17a. Thus, the side ends of the coupling member 20 are closed, that is, a casing including the coupling member 20 is formed.

In general, with the PCCP structure, the highest strength is obtained when four sides of the member in which the structure is provided are closed (or when the member is fixed and jointed to another member). Therefore, by arranging the coupling member 20 with the above configuration, the strength of the coupling member 20 is enhanced due to the structure, so that the seat frame F having a high strength against the load at the time of the collision is obtained.

The PCCP structure will be described in detail with reference to FIG. 3.

FIG. 3 shows the surface of the coupling member 20 on which the PCCP structure is formed. The PCCP structure is a structure in which framework structures (truss structures) of the polygons, such as the triangles, are three-dimensionally combined. Since the thickness thereof is reduced while maintaining the strength, the member in which the PCCP structure is formed can have a lighter weight.

Figure 3A:
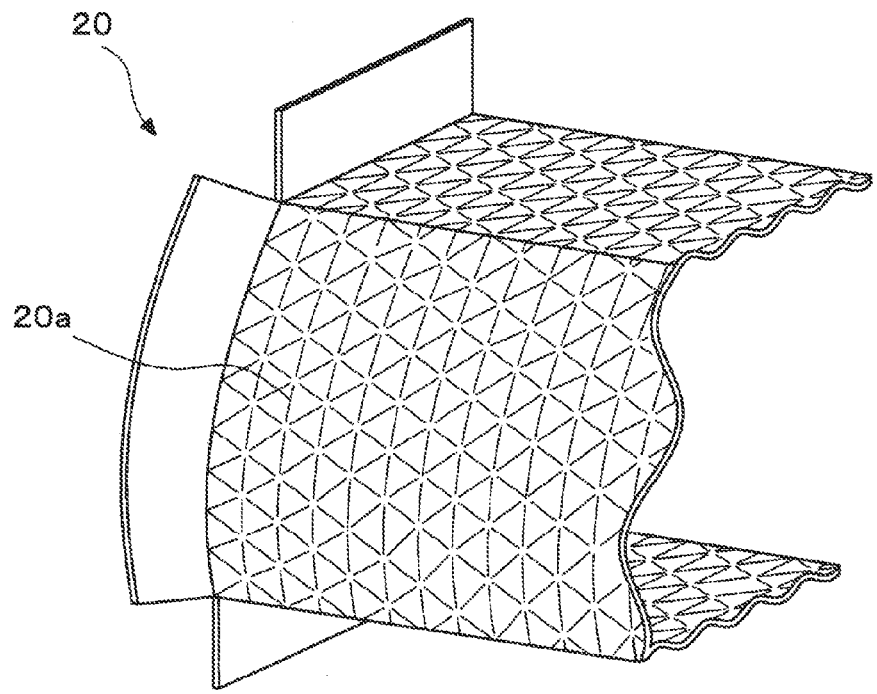
FIG. 3A is an illustrative perspective view of a coupling member according to the first embodiment of the present invention.
Figure 3B:
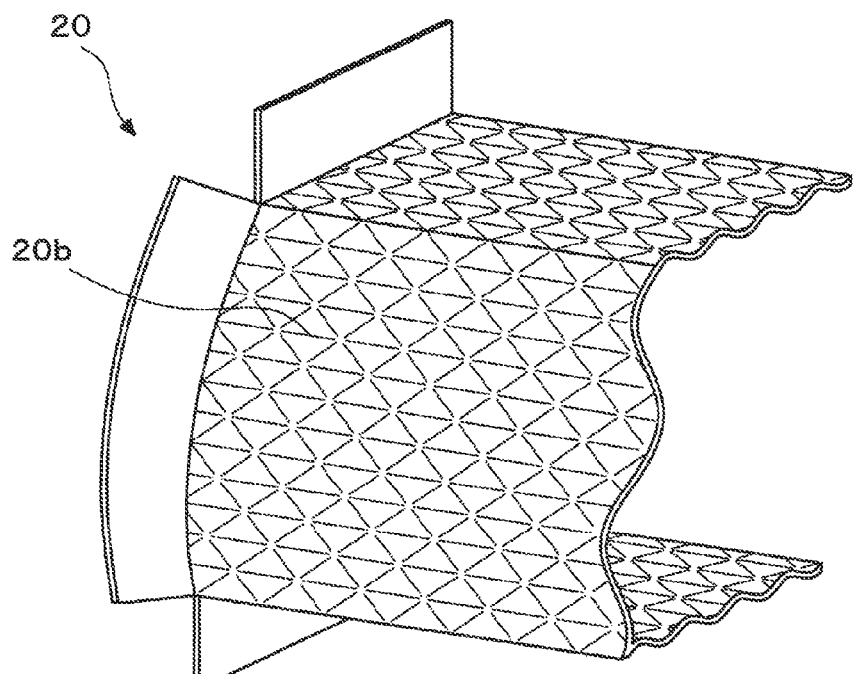
FIG. 3B is an illustrative perspective view of the coupling member according to the first embodiment of the present invention.

In FIGS. 3A and 3B, the triangle recesses and projections are continuously formed on the coupling member 20. In FIG. 3A, continuous sides formed by the triangles spread all over without any clearance, that is, sides 20a are provided to extend in the up and down direction. The triangle recesses and projections are formed so that a pair of the sides 20a among the continuous sides formed by the combined triangles is substantially perpendicular to the load from the side. With such a configuration, when the load from the side is imposed on the coupling member 20, due to the load direction perpendicular to the sides 20a, the load is received by the sides 20a, so that the rigidity is enhanced.

In FIG. 3B, continuous sides formed by the triangles spread all over without any clearance, that is, sides 20b are provided to extend in the left and right direction. The triangle recesses and projections are formed so that a pair of the sides 20b among the continuous sides formed by the combined triangles is substantially parallel to the load from the side.

With such a configuration, when the load from the side is imposed on the coupling member 20, due to the load direction parallel to the sides 20b, the load imposed on the sides 20b is dispersed. Therefore, in FIG. 3B in comparison to the configuration of FIG. 3A, the rigidity is further enhanced particularly against the load from the side.

In such a way, since the strength is changed depending on the fold line directions of the PCCP structure, the fold line directions of the PCCP structure are appropriately designed in accordance with required strength of the member.

The length of the one side of the polygon such as the triangle in the PCCP structure is appropriately designed depending on a shape of the coupling member 20 or a part in which the PCCP structure is formed. Such regular polygonal recesses and projections are formed by the press molding.

Further, another surface shape of the coupling member 20 will be described with reference to FIG. 4.

Unlike the above coupling member 20 in which the PCCP structure is formed, a plurality of concave portions may be formed in the coupling member 20, that is, a dimple structure may be formed.

Figure 4:
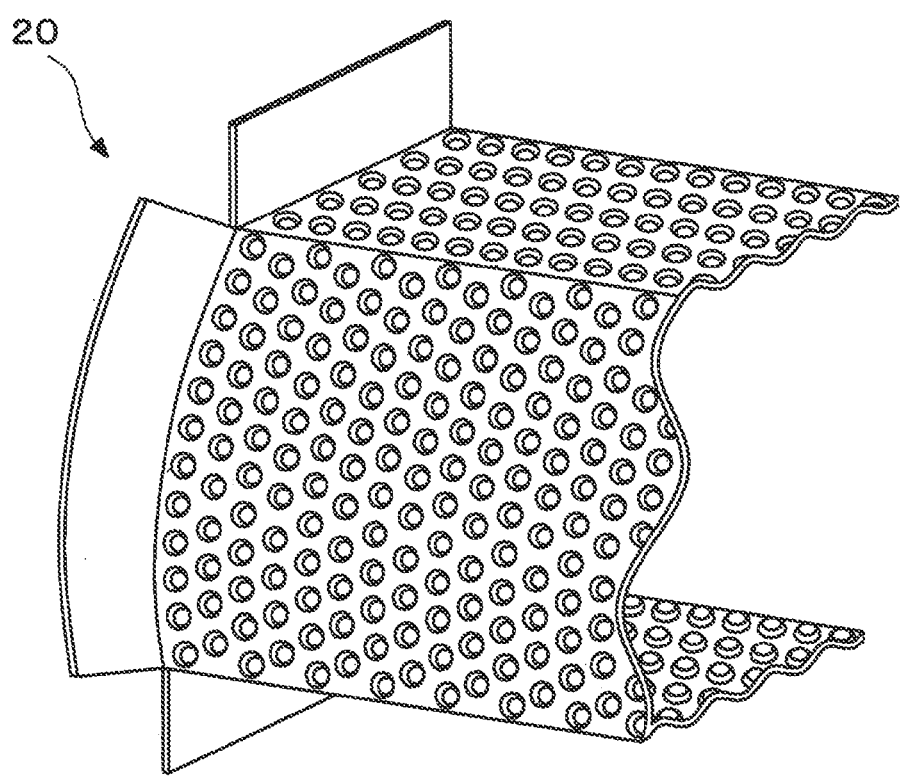
FIG. 4 is an illustrative perspective view of the coupling member according to the first embodiment of the present invention.

As shown in FIG. 4, the coupling member 20 has the dimple structure in which a plurality of cylindrical or frustum concave portions is provided on the surface thereof. In general, as well as the PCCP structure, by forming the dimple structure on the surface, deformation resistance against the load applied from the outside is large in comparison to a flat and smooth plate.

By forming such a dimple structure, the coupling member 20 can also have a lighter weight. Thus, the seat frame F having a lighter weight and a high strength is obtained.

In the case where dimples are formed in a member arranged at a position where the member is abutted with the cushion pads 1a, 2a, with the dimples making projections on the side of the cushion pads 1a, 2a, the cushion pads 1a, 2a are easily held by the dimples. As a result, the seat frame F in which the cushion pads 1a, 2a are not easily displaced is obtained.

With the dimples making the projections on the opposite side of the cushion pads 1a, 2a, contact areas with the cushion pads 1a, 2a are reduced. Thus, noise at the time of vehicle running is suppressed. Therefore, by the orientation of the recesses and the projections of the dimples, displacement of the cushion pads 1a, 2a and the noise at the time of the vehicle running is prevented.

Configurations of the dimple structure will be described in detail with reference to FIG. 5.

Figure 5A:
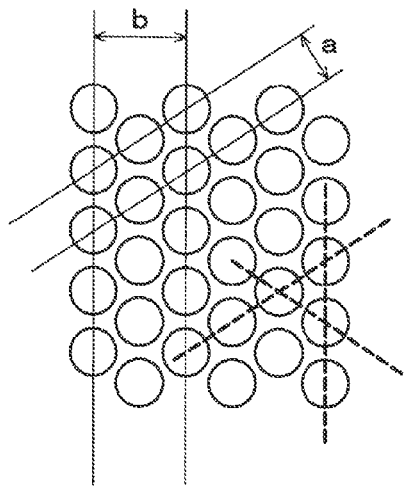
FIG. 5A is an enlarged view of a surface of the coupling member according to the first embodiment of the present invention.
Figure 5B:
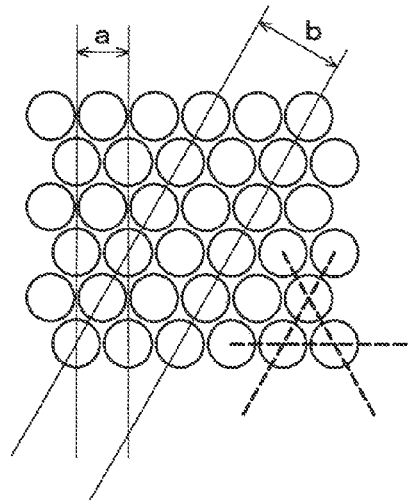
FIG. 5B is an enlarged view of the surface of the coupling member according to the first embodiment of the present invention.
Figure 5C:
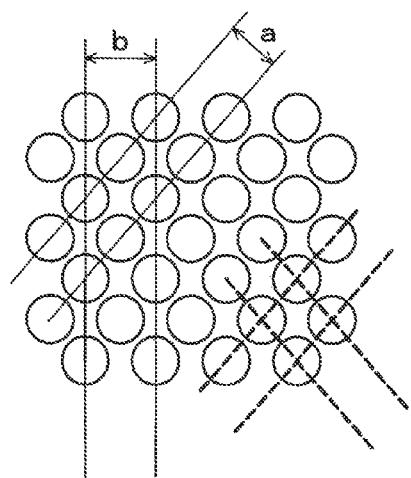
FIG. 5C is an enlarged view of the surface of the coupling member according to the first embodiment of the present invention.
Figure 5D:
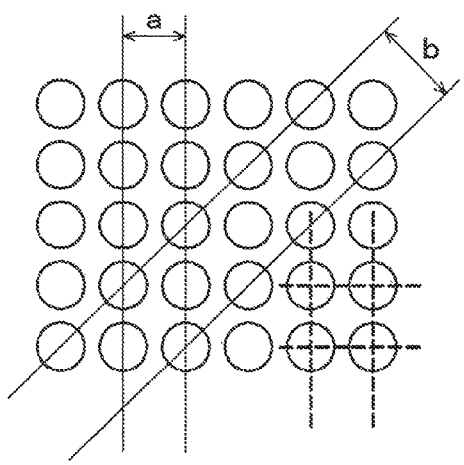
FIG. 5D is an enlarged view of the surface of the coupling member according to the first embodiment of the present invention.

FIGS. 5A to 5D respectively show arrangement patterns of the dimples. In FIGS. 5A to 5D, the dimples are regularly and continuously formed, and FIGS. 5A and 5B show configurations that adjacent dimples are arranged at vertices of a triangle. FIGS. 5C and 5D show configurations that adjacent dimples are arranged at vertices of a square.

In a case of FIGS. 5A and 5B in which the adjacent dimples are arranged at the vertices of the triangle, a configuration of FIG. 5B that the dimples are arranged so that width of the dimples in the left and right direction (the seat width direction) is reduced, that is, a<b, is preferable, since the strength against the load from the side is enhanced. In a case of FIGS. 5C and 5D in which the dimples are arranged at the vertices of the square, with a configuration of FIG. 5D that the dimples are arranged so that a gap in the left and right direction (the seat width direction) is reduced, the strength against the load in the seat width direction is enhanced.

Other than the coupling member 20, the PCCP structure or the dimple structure may be provided in any of the members forming the seat frame F such as the reclining shaft (not shown), the upper frame 16, the lower frame 17, the side frames 15, and the seating frame 2. In the case where the PCCP structure or the dimple structure is formed in the seating frame 2, the PCCP structure or the dimple structure is preferably formed in the pan frame bridged in the seating frame 2.

Figure 6:
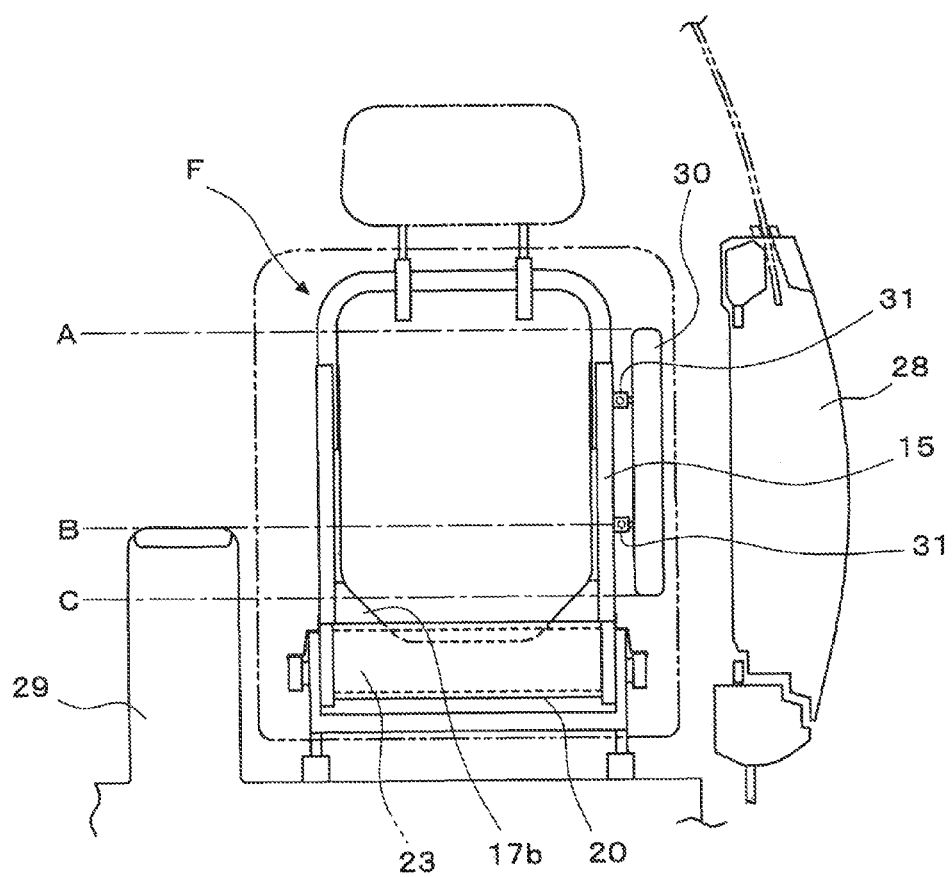
FIG. 6 is a front view of the seat frame according to the first embodiment.

As shown in FIG. 6, in the seat frame F, the side airbag unit 30 is preferably arranged between a vehicle door 28 and the side frame 15.

Hereinafter, a range where the PCCP structure or the dimple structure is formed will be described with reference to FIG. 6.

FIG. 6 shows a state that the seat frame is seen from the front side when the side airbag unit 30 is provided on the side of the vehicle door 28 side of the side frame 15. The side airbag unit 30 is supported by joint members arranged in brackets 31 via the brackets 31 installed in the side frame 15, and joint members provided in the side airbag unit 30. At this time, bolts and nuts and the like are used as the joint members.

As in FIG. 6, when the PCCP structure or the dimple structure is formed in at least a part of the members (such as the side frame 15) arranged in a range from upper attachment height (line A in FIG. 6) of the side airbag unit 30 to lower attachment height (line C in FIG. 6), the strength is enhanced due to the part in which the PCCP structure or the dimple structure is formed. Thus, even in the case where a side airbag provided inside the side airbag unit 30 is inflated at the time of the collision on the side surface, the shock in accordance with inflation of the side airbag is absorbed.

The PCCP structure or the dimple structure is preferably formed in the members arranged in an attachment range of the side airbag unit 30, that is, the entire area of the range from the line A to the line C in FIG. 6, or further over a wider range, since the strength is further improved.

The PCCP structure or the dimple structure is preferably provided in at least a part of a height range of a top surface of a console box 29 installed on the side of the vehicle seat S (height of line B in FIG. 6) in the members forming the seat frame F (such as the seating frame 2, the coupling member 20, and the side frame 15). With this configuration, since the strength of the seat frame F is enhanced in a range corresponding to the console box 29, the shock from the side is easily transmitted to the console box 29.

With this configuration, since the strength of the members is enhanced, the seat frame F has a higher strength and a lighter weight. When the PCCP structure or the dimple structure is formed in the seat frame F in a range corresponding to the console box 29 and the side airbag unit 30 in the seat frame F, the strength against the load in the seat width direction is further improved. When the PCCP structure or the dimple structure is formed in a further wider range including the above range, the strength is further improved as a matter of course.

Further, the seat back frame 1 is not necessarily formed by the side frames 15, the upper frame 16, the lower frame 17, and the like as described above. That is, the PCCP structure or the dimple structure may be similarly formed in a seat back frame formed by jointing two front and rear plate shaped frames to each other to form a casing.

With such a configuration, the seat back frame having a high strength with a reduced number of parts and a simple structure is provided.

Second Embodiment

Figure 7:
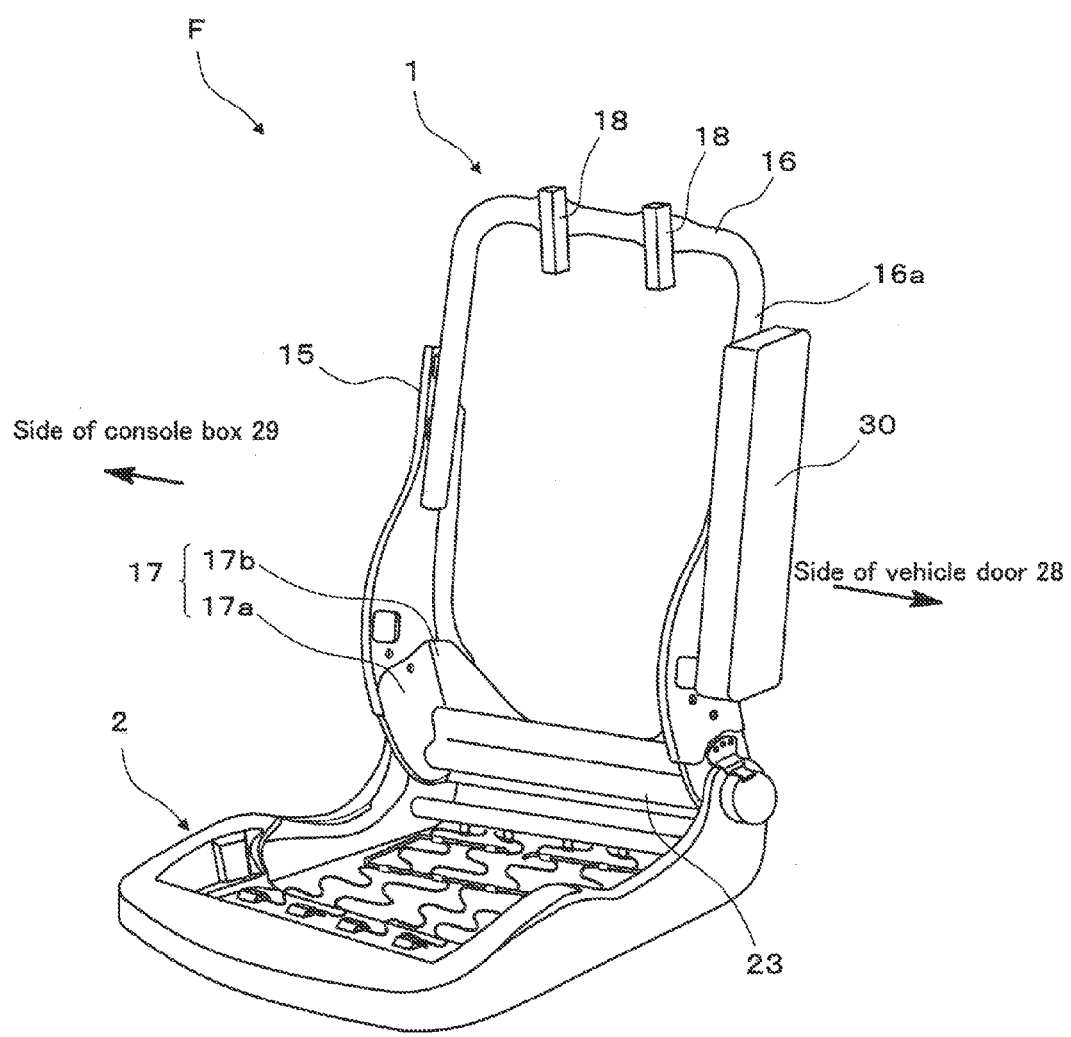
FIG. 7 is a schematic perspective view of a seat frame according to a second embodiment.

The second embodiment will be described with reference to FIG. 7. FIG. 7 is a schematic perspective view of a seat frame according to the second embodiment of the present invention. Except a configuration that the coupling member 20 is not provided unlike the first embodiment in which the coupling member 20 is provided, the second embodiment has the same configurations as the first embodiment. Therefore, only a configuration of the differences will be described.

In the second embodiment, the coupling member 20 is not provided in the lower part of the seat back frame 1 but only the member frame 23 is provided. A surface of the member frame 23 forms smooth recesses and projections in the up and down direction, and an upward bulged surface is formed. In such a way, since the smooth recesses and projections are formed, the load in the left and right direction (the seat width direction) is received by line parts thereof. Thus, the strength is further enhanced.

The reclining shaft (not shown) is arranged inside the hollow member frame 23, and the member frame 23 and the reclining shaft are arranged at positions where the member frame and the reclining shaft do not interfere to each other.

In the second embodiment, the PCCP structure or the dimple structure described above is preferably formed in at least the member frame 23. With this configuration, since the strength of the member frame 23 is enhanced, the rigidity against the load from the side is enhanced in the seat frame F. Therefore, in the case where sufficient strength is obtained only by forming the PCCP structure or the dimple structure in the member frame 23, the coupling member 20 is not necessarily provided. As a result, the seat frame F can have a lighter weight.

Third Embodiment

Figure 8:
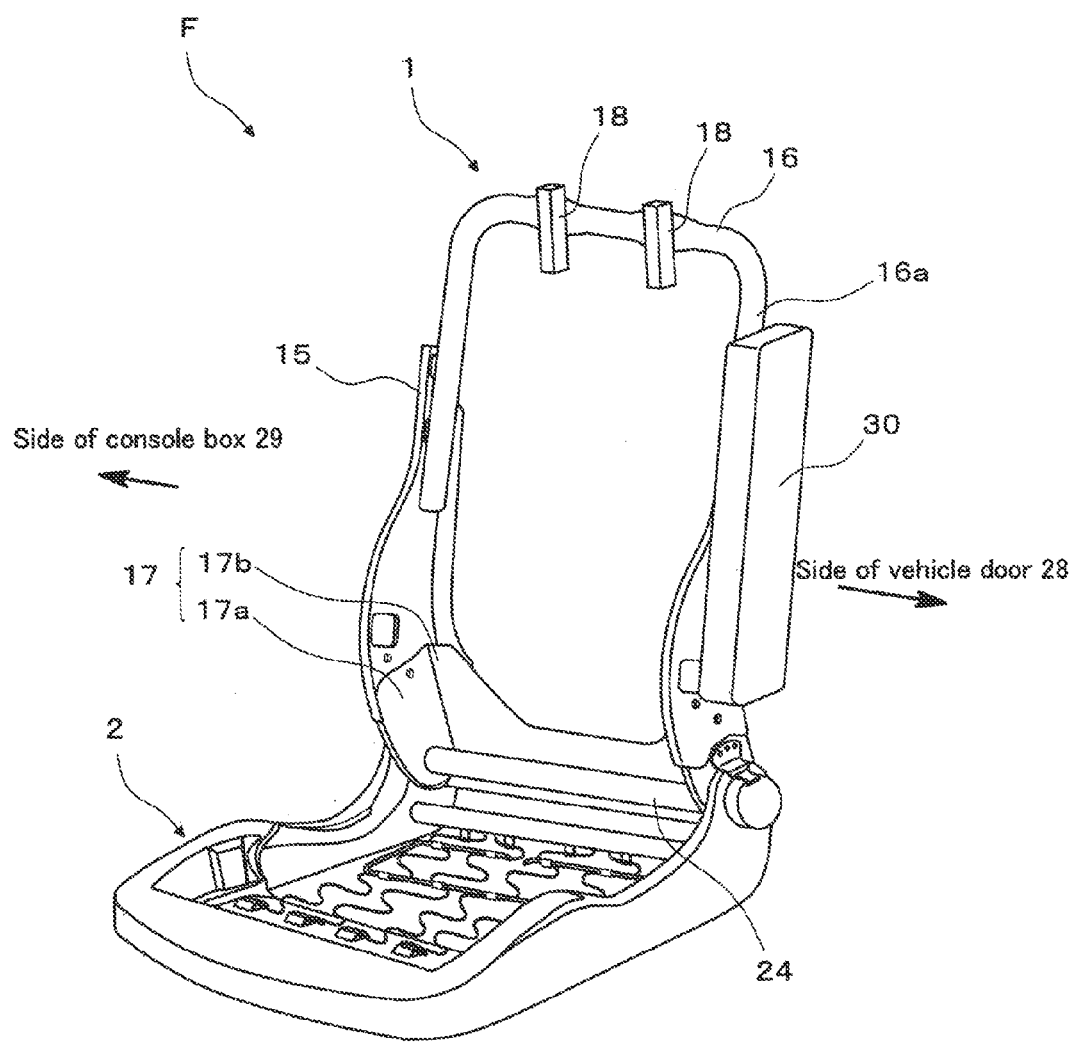
FIG. 8 is a schematic perspective view of a seat frame according to a third embodiment.

A third embodiment will be described with reference to FIG. 8. FIG. 8 is a schematic perspective view of a seat frame according to the third embodiment of the present invention. Except a configuration that the member frame 23 is not provided unlike the second embodiment in which the member frame 23 is provided, the third embodiment has the same configurations as the second embodiment. Therefore, only the differences will be described.

In the third embodiment, the member frame 23 is not provided in the lower part of the seat back frame 1 but only a reclining shaft 24 is provided. The reclining shaft 24 is formed into a tubular shape, and ends thereof are inserted into the extension portions 17*a* of the lower frame 17.

In the third embodiment, the PCCP structure or the dimple structure is preferably formed in the reclining shaft 24. Therefore, in the case where sufficient strength is obtained only by forming the PCCP structure or the dimple structure in the reclining shaft 24, the member frame 23 is not necessarily provided. As a result, the seat frame F has a further lighter weight.

Fourth Embodiment

Figure 9:
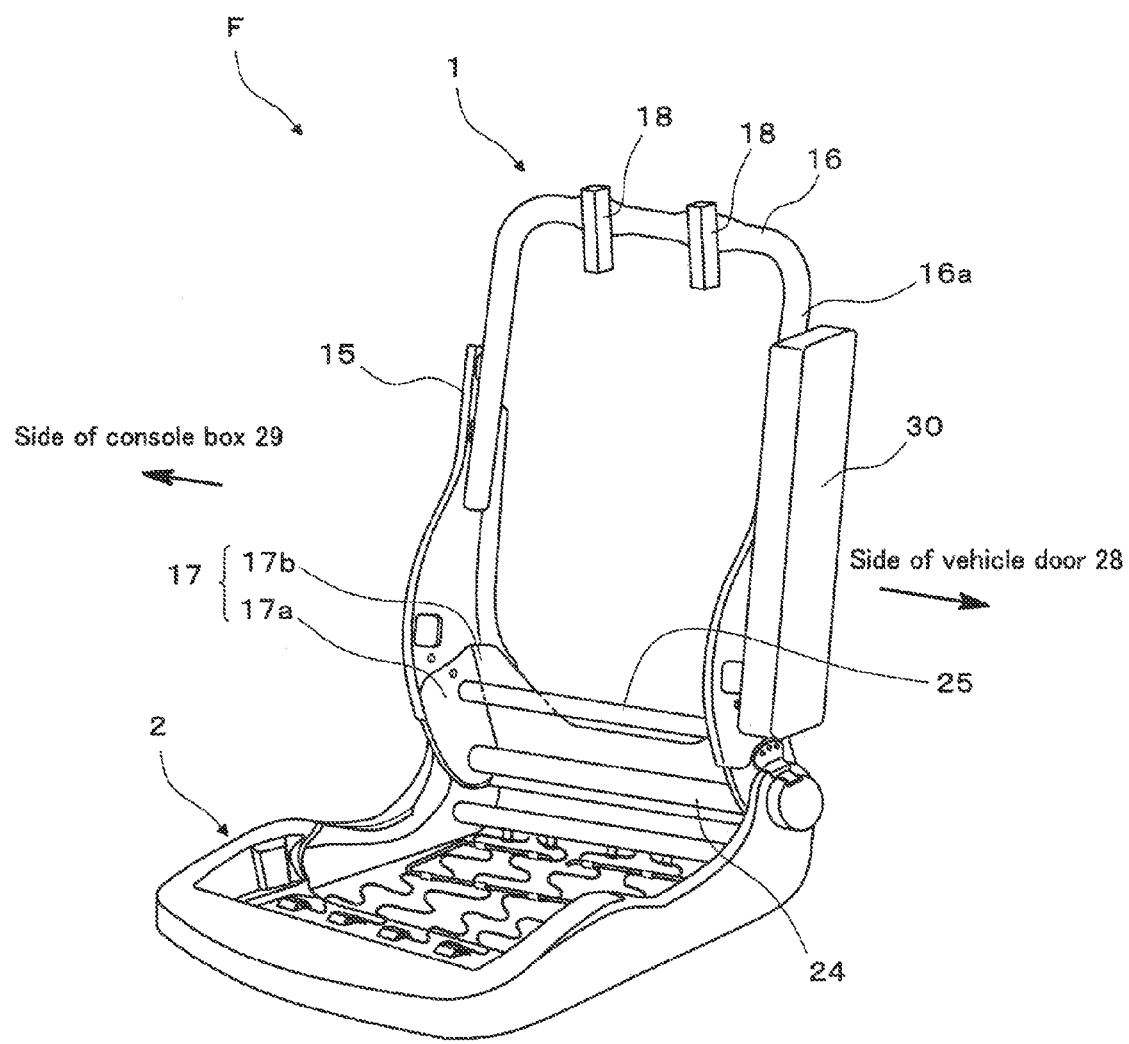
FIG. 9 is a schematic perspective view of a seat frame according to a fourth embodiment.

A fourth embodiment will be described with reference to FIG. 9. FIG. 9 is a schematic perspective view of a seat frame according to the fourth embodiment of the present invention. Except a configuration that a coupling member 25 is further provided unlike the third embodiment in which only the reclining shaft 24 is provided in the lower part of the seat back frame 1, the fourth embodiment has the same configurations as the third embodiment. Therefore, only the differences will be described.

In the fourth embodiment, the coupling member 25 is provided separately from the reclining shaft 24 in the seat back frame 1. The coupling member 25 is formed into a tubular shape, and ends thereof are fixed and jointed to the extension portions 17*a* of the lower frame 17.

The end of the coupling member 25 is preferably arranged at the lowest attachment position of the side airbag unit 30 provided in the side frame 15. When the end of the coupling member 25 is at the lowest attachment position of the side airbag unit 30, the shock at the time of the inflation of the side airbag is received by the coupling member 25. Thus, the strength is further enhanced.

In the fourth embodiment, the PCCP structure or the dimple structure is preferably formed in the coupling member 25. Further, the PCCP structure or the dimple structure is preferably also formed in the reclining shaft 24, since the strength against the load in the left and right direction (the seat width direction) is further enhanced.

In such a way, in the seat frame F, a regular recess-projection structure such as the PCCP structure and the dimple structure is formed in the members forming the seat back frame 1 and the seating frame 2. In a conventional seat back frame, a reinforcing member is provided in order to particularly improve strength against the collision on the side surface. Therefore, unlike the conventional seat frame having the large number of members such as the reinforcing member and many joint points of these members, the seat frame F does not require a specific reinforcing member to be installed and has enough rigidity against the load at the time of the collision with the above configuration. That is, even in the case where an excessive shock is given at the time of the collision or the like, a seating space of the passenger is ensured, and further, the load thereof is transmitted to a vehicle body without the deformation.

Further, the seat frame F has a simple configuration that the regular recess-projection structure such as the PCCP structure and the dimple structure is provided in the members forming the seat frame F. Therefore, the seat frame does not require other reinforcing members unlike the conventional seat back frame, so that the number of parts is minimized. Thus, the inexpensive seat back frame 1 having a lighter weight and a high productivity is provided.

By closing the four sides of the member having the recess-projection structure in the seat back frame F, the strength in the seat width (left and right) direction and the seat front and rear direction is high due to the structure. Therefore, the deformation resistance is large against stress applied at the time of the collision, so that the deformation of the seat frame F is prevented.

Although the seat frame F of a front seat of a motor vehicle is described in the above embodiments as a specific example, the present invention is not limited to this. The same configuration can also be applied to a seat frame of a rear seat as a matter of course.

All references, including publications, patent applications, and patents, cited herein are hereby incorporated by reference to the same extent as if each reference were individually and specifically indicated as incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of components that perform the specified functions.

The particular implementations shown and described herein are illustrative examples of the invention and are not intended to otherwise limit the scope of the invention in any way. For the sake of brevity, conventional aspects of the systems (and components of the individual operating components of the systems) may not be described in detail. Furthermore, the connecting lines, or connectors shown in the various figures presented are intended to represent exemplary functional relationships and/or physical or logical couplings between the various elements. Many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

The words "mechanism" and "element" are used herein generally and are not limited solely to mechanical embodiments. Numerous modifications and adaptations will be readily apparent to those skilled in this art without departing from the spirit and scope of the present invention.

TABLE OF REFERENCE CHARACTERS

S Vehicle seat
S1 Seat back
S2 Seating portion
S3 Headrest
F Seat frame
1 Seat back frame
2 Seating frame
1a, 2a, 3a Cushion pad (cushion material)
1b, 2b, 3b Skin material
15 Side frame (side member)
16 Upper frame (upper member)
16a Side surface portion
17 Lower frame (lower member)
17a Extension portion
17b Intermediate portion
18 Pillar support portion
19 Headrest pillar
20, 25 Coupling member (bridging member)
20a, 20b Side
23 Member frame (lower member)
24 Reclining shaft
28 Vehicle door
29 Console box
30 Side airbag unit
31 Bracket

What is claimed is:

1. A vehicle seat, comprising:
 a rigid seat frame;
 cushion material and a skin material on the seat frame; and
 a plurality of structural features that are at least one of triangular and circular pattern elements that are at least one of recesses and projections that are continuously formed in at least a part of the seat frame, wherein the pattern elements do not penetrate the seat frame.

2. The vehicle seat according to claim 1, further comprising:
 a side airbag unit that is arranged on a side of the vehicle seat;
 wherein:
 the structural features are formed on a surface in at least a part of the seat frame at a position adjacent to the side airbag unit.

3. The vehicle seat according to claim 1, wherein:
 the structural features are formed in at least a part of the seat frame at a position adjacent to a console box installed on a side of the vehicle seat.

4. The vehicle seat according to claim 1, further comprising:
 a coupling member for coupling side frames of the seat frame arranged spaced from each other;
 wherein:
 the structural features are continuously and regularly formed on a surface in at least a part of the coupling member.

5. The vehicle seat according to claim 4, wherein:
 the coupling member has a bulged surface curved upward and bulged; and
 the structural features are continuously formed at the bulged surface of the coupling member.

6. The vehicle seat according to claim 4, wherein:
 the coupling member is formed by a tubular member.

7. The vehicle seat according to claim 1, further comprising:
 a side airbag unit that is arranged on a side of the vehicle seat; and
 a console box installed on a side of the vehicle seat,
 wherein:
 the structural features are formed on a surface in at least a part of the seat frame at a position adjacent to the side airbag unit and adjacent to the console box.

8. The vehicle seat according to claim 4, wherein the plurality of the structural features are continuously formed from one end to another end of the coupling member in a right-to-left direction.

9. The vehicle seat according to claim 4, wherein a cross-section surface of the coupling member has a U shape that is formed from an upper surface, a front surface and a lower surface and that has an open rear side.

10. The vehicle seat according to claim 5, wherein the bulged surface is continuously formed from one end to another end of the coupling member in a right-to-left direction.

11. The vehicle seat according to claim 5, wherein the plurality of the structural features are continuously formed from one end to another end of the bulged surface in a right-to-left direction.

12. The vehicle seat according to claim 2, wherein:
 the structural features are formed on a surface in at least a part of the seat frame at a height lower than a highest part of the side airbag unit, and at a height higher that a lowest part of the side airbag unit.

13. The vehicle seat according to claim 3, wherein:
 the structural features are formed on a surface in at least a part of the seat frame at a height lower than a highest part of the console box.

14. The vehicle seat according to claim 7, wherein:
 the structural features are formed on a surface in at least a part of the seat frame at a height lower than a highest part of the side airbag unit, and at a height higher that a lowest part of the side airbag unit; and
 the structural features are formed on a surface in at least a part of the seat frame at a height lower than a highest part of the console box.

* * * * *